United States Patent
Cho et al.

(10) Patent No.: US 9,939,203 B2
(45) Date of Patent: Apr. 10, 2018

(54) VARIABLE HEAT REJECTION USING HEAT PIPE HEAT EXCHANGER

(71) Applicant: Hamilton Sundstrand Corporation, Charlotte, NC (US)

(72) Inventors: Wei-Lin Cho, Strawfield, CT (US); Gary A. Adamson, North Granby, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 182 days.

(21) Appl. No.: 14/739,364

(22) Filed: Jun. 15, 2015

(65) Prior Publication Data
US 2016/0363381 A1 Dec. 15, 2016

(51) Int. Cl.
| | |
|---|---|
| F28F 27/00 | (2006.01) |
| G05D 16/00 | (2006.01) |
| G05D 23/00 | (2006.01) |
| F28D 15/02 | (2006.01) |
| B64G 1/50 | (2006.01) |

(52) U.S. Cl.
CPC ........... *F28D 15/02* (2013.01); *B64G 1/50* (2013.01); *B64G 1/506* (2013.01); *F28D 15/0266* (2013.01); *F28D 15/0275* (2013.01); *B64G 1/503* (2013.01)

(58) Field of Classification Search
CPC ...... F28D 15/06; F28D 15/02; F28D 15/0266; F28D 15/0275; B64G 1/50; B64G 1/503; B64G 1/506; F28F 2250/06
USPC .......... 165/287, 282, 283, 296, 297, 104.13, 165/104.14
See application file for complete search history.

(56) References Cited

U.S. PATENT DOCUMENTS

| | | | |
|---|---|---|---|
| 4,161,212 A | 7/1979 | Hightower | |
| 4,420,035 A | 12/1983 | Hewitt | |
| 5,036,905 A | 8/1991 | Eninger et al. | |
| 5,150,748 A | 9/1992 | Blackmon et al. | |
| 5,159,972 A | 11/1992 | Gunnerson et al. | |
| 5,771,967 A | 6/1998 | Hyman | |
| 5,954,298 A | 9/1999 | Basuthakur et al. | |
| 6,415,619 B1* | 7/2002 | Bash .................. | F25B 5/02 257/E23.098 |
| 8,910,701 B2 | 12/2014 | Torres Sepúlveda et al. | |

(Continued)

FOREIGN PATENT DOCUMENTS

JP H06109382 A 4/1994

OTHER PUBLICATIONS

European Search Report for European Application No. 16174573.2 dated Nov. 16, 2016.

*Primary Examiner* — Jason Thompson
(74) *Attorney, Agent, or Firm* — Carlson, Gaskey & Olds, P.C.

(57) ABSTRACT

A system according to an exemplary aspect of the present disclosure includes, among other things, a control unit and a heat pipe heat exchanger having a first heat pipe and a second heat pipe. The system also includes a first flow regulator selectively adjustable in response to instructions from the control unit to direct a first flow of fluid over a portion of the first heat pipe. Further, the system includes a second flow regulator selectively adjustable in response to instructions from the control unit to direct a second flow of fluid over a portion of the second heat pipe. A method is also disclosed.

6 Claims, 4 Drawing Sheets

(56) References Cited

U.S. PATENT DOCUMENTS

| | | | |
|---|---|---|---|
| 2004/0182086 A1* | 9/2004 | Chiang | F25B 21/00 62/3.1 |
| 2005/0046801 A1* | 3/2005 | Yamada | F28D 15/0275 353/54 |
| 2008/0115923 A1* | 5/2008 | Yamanaka | F01N 5/02 165/276 |
| 2008/0277532 A1* | 11/2008 | Wong | B64G 1/425 244/171.8 |
| 2009/0211277 A1* | 8/2009 | Rummel | F28D 15/0275 62/113 |
| 2011/0056668 A1* | 3/2011 | Taras | F28D 1/0478 165/174 |
| 2012/0151938 A1* | 6/2012 | Przybylski | F01N 5/025 62/3.2 |

* cited by examiner

VARIABLE HEAT REJECTION USING HEAT PIPE HEAT EXCHANGER

BACKGROUND

Spacecraft, such as space shuttles, space stations, and satellites have internal environments (e.g., cabins or heat generating components) that are cooled by a coolant loop. The coolant loop circulates a flow of coolant which absorbs heat from the internal environment of the spacecraft. The coolant may absorb heat from the cabin itself, or from other components (such as mechanical or electronic components) associated with the spacecraft. The heat absorbed by the coolant is then rejected to an external environment using a heat sink.

In space applications, the heat sink is known to be provided by a radiator that is located at least partially external to the spacecraft. The effective cold sink provided by outer space varies quite widely depending on spacecraft orientation. This will provide an effective heat sink. As the coolant within the coolant loop flows within the radiator, the heat within the coolant is rejected to outer space. Downstream of the radiator, the coolant is recirculated back to the coolant loop.

The heat rejection capacity of the radiator is fixed by the size of the radiator, the optical property of the radiator surface, and the effective temperature of the radiator surface. The radiator is typically sized to handle an expected upper limit operating temperature and heat load (e.g., a "worst case" operating condition) of the spacecraft. Some other types of radiators allow for variable heat rejection using variable emissivity surface coatings or mechanical louvers.

SUMMARY

A system according to an exemplary aspect of the present disclosure includes, among other things, a control unit and a heat pipe heat exchanger having a first heat pipe and a second heat pipe. The system also includes a first flow regulator selectively adjustable in response to instructions from the control unit to direct a first flow of fluid over a portion of the first heat pipe. Further, the system includes a second flow regulator selectively adjustable in response to instructions from the control unit to direct a second flow of fluid over a portion of the second heat pipe. A method is also disclosed and claimed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
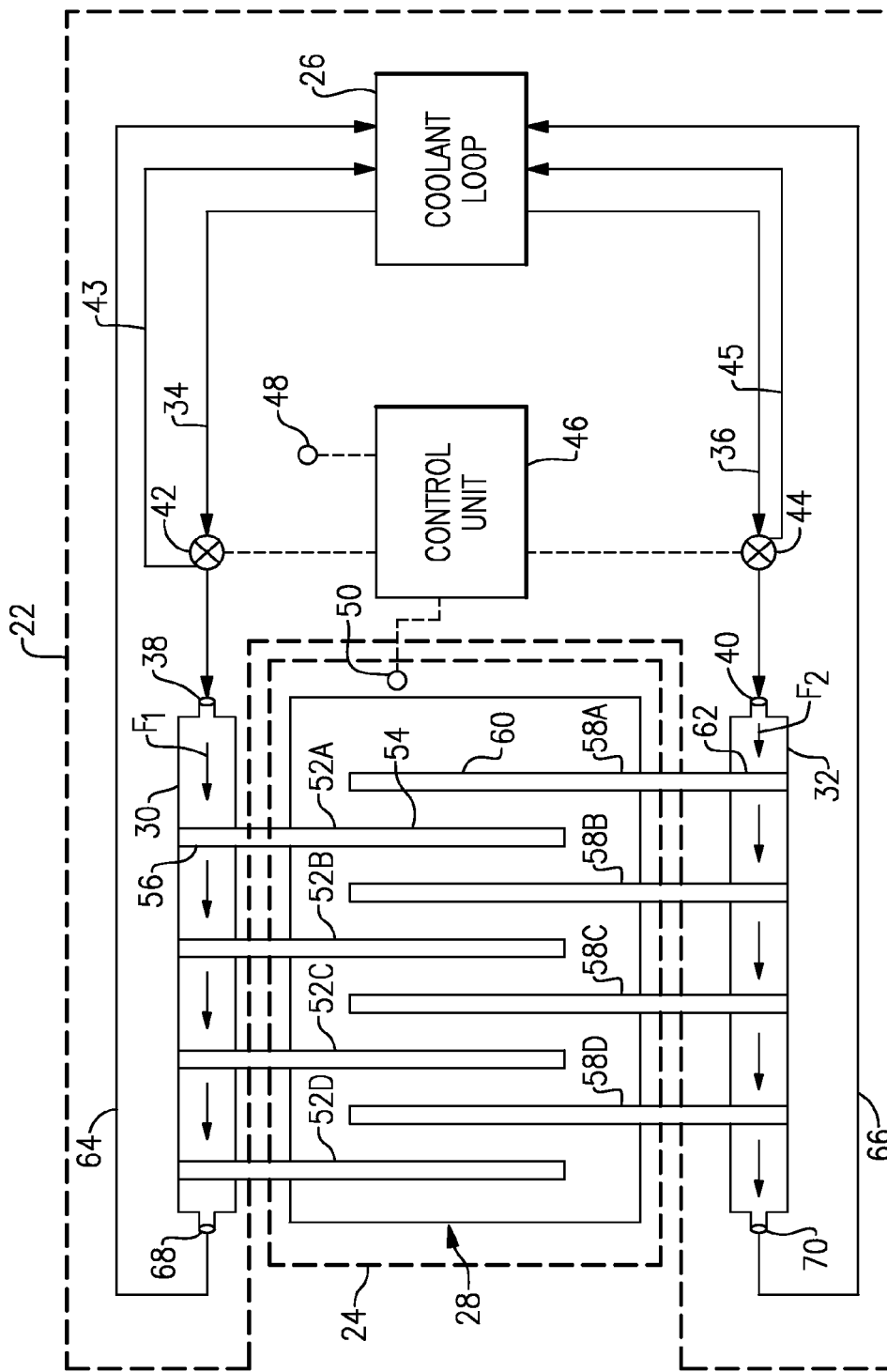
FIG. 1 schematically illustrates a first example system according to this disclosure.

FIG. 1 schematically illustrates a first example system 20 according to this disclosure. The system 20 allows for heat rejection between an internal environment, which in this example includes the interior of a spacecraft 22, and an external environment 24, which in this example is outer space.

The system 20 includes a coolant loop 26 configured to circulate a flow of cooling fluid (referred to herein as "coolant" or "fluid") within the spacecraft 22. The coolant within the coolant loop 26 could be any known type of coolant. This disclosure is not limited to any particular coolant type.

The coolant loop 26 may be arranged to cool the occupant space (e.g., the cabin) and/or may be used to cool other components associated with the spacecraft 22. As coolant circulates within the coolant loop 26, the coolant absorbs heat. The coolant loop 26 is configured to direct the coolant to a heat sink, which in this example is provided by a heat pipe heat exchanger 28 at least partially located in the external environment 24.

In the example of FIG. 1, the coolant loop 26 is fluidly coupled to first and second heat exchangers 30, 32 via first and second inlet lines 34, 36. In this example, the first and second inlet lines 34, 36 are arranged in parallel to one another. The first and second inlet lines 34, 36 are fluidly coupled to an inlet 38, 40 of a respective one of the first and second heat exchangers 30, 32 via an adjustable flow regulator 42, 44. The adjustable flow regulators 42, 44 may be provided by any known type of valve. For instance, the adjustable flow regulators 42, 44 may be shut-off valves or infinitely adjustable valves, including electro-mechanical valves. Further, there may be recirculation lines 43, 45 between the respective adjustable flow regulators 42, 44 and the coolant loop 26. The adjustable flow regulators 42, 44 are configured to direct a selected amount of fluid to the heat exchangers 30, 32 to provide variable heat rejection. The remainder of the flow of fluid is directed back to the coolant loop 26 via the recirculation lines 43, 45.

The adjustable flow regulators 42, 44 are selectively adjustable in response to instructions from a control unit 46. The control unit 46 may be any known type of control unit including memory, hardware, and software. The control unit 46 is configured to store instructions and to provide instructions to the various components of the system 20, including the adjustable flow regulators 42, 44.

The control unit 46 is electrically coupled to at least one internal conditions sensor 48 located within the spacecraft 22. The internal conditions sensor 48 may be a temperature sensor configured to generate signals indicative of the temperature within the spacecraft 22. The control unit 46 is further electrically coupled to at least one external conditions sensor 50, which is located external to the spacecraft 22. Like the sensor 48, the external conditions sensor 50 may also be a temperature sensor configured to generate a signal indicative of the temperature outside the spacecraft 22.

Again, in this example, the external environment 24 is outer space. The effective cold sink temperatures provided by outer space can vary widely. The heat pipe heat exchanger 28 is configured to reject heat absorbed by the coolant within the coolant loop 26 to the external environment 24.

In this example, the heat pipe heat exchanger 28 includes a first plurality of heat pipes 52A-52D, each of which has a first portion 54 within the external environment 24 and a second portion 56 within the first heat exchanger 30. In this example, the heat pipe heat exchanger 28 further includes a second plurality of heat pipes 58A-58D, each having a first portion 60 within the external environment 24 and a second portion 62 within the second heat exchanger 32.

Each of the heat pipes 52A-52D, 58A-58D contains a heat pipe working fluid, such as ammonia. The heat pipes 52A-52D, 58A-58D are fluidly isolated from the external environment 24 and the heat exchangers 30, 32. In other words, there is no intermixing between the fluid within the heat exchangers and the fluid within the heat pipes. The heat pipes 52A-58A maybe any known type of heat pipe, and may include concentric sections configured to direct the relatively warm heat pipe working fluid toward the heat pipe heat exchanger 28 and the relatively cool heat pipe working fluid toward a respective one of the heat exchangers 30, 32.

The control unit 46 is configured to selectively adjust the first and second flow regulators 42, 44 to direct flows of coolant $F_1$, $F_2$ from the coolant loop 26 to the first and second heat exchangers 30, 32. Heat from the flows of coolant $F_1$, $F_2$ is rejected to the heat pipes 52A-52D, 58A-58D by convection and conduction as the flows of coolant $F_1$, $F_2$ pass over the portions 56, 62 of the heat pipes 52A-52D, 58A-58D within the respective heat exchanger 30, 32. Downstream of the first and second heat exchangers 30, 32, the flows of coolant $F_1$, $F_2$ are directed, in parallel, back to the coolant loop 26 by way of first and second return lines 64, 66 via respective outlets 68, 70 of the heat exchangers 30, 32.

The control unit 46 is configured to make appropriate adjustments to the first and second flow regulators 42, 44 in response to the signals received from the sensors 48, 50. For example, in some cases the coolant within the coolant loop 26 requires relatively little cooling (as determined by the control unit 46 in response to the signals from the sensors 48, 50). In those instances, the control unit 46 may instruct the first flow regulator 42 to open, while instructing the second flow regulator 44 to be closed. If additional cooling is required, both flow regulators 42, 44 can be opened.

Figure 2:
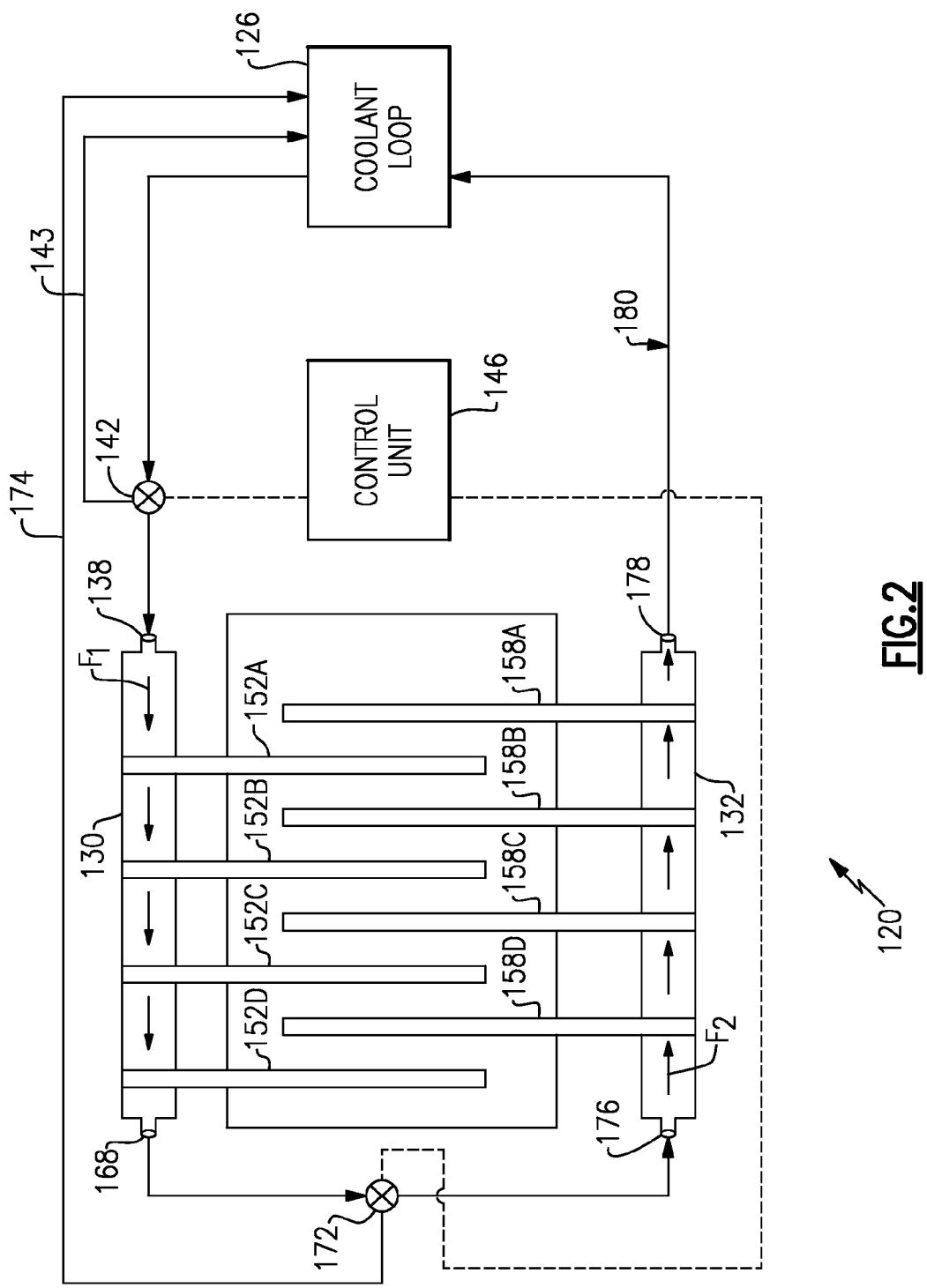
FIG. 2 schematically illustrates a second example system according to this disclosure.

In FIG. 1, the coolant loop 26 is arranged to direct parallel flows of coolant to and from the first and second heat exchangers 30, 32. However, in another example system 120, the heat exchangers 130, 132 may be arranged in series. To the extent not otherwise described or shown, the system 120 of FIG. 2 corresponds to the system 20 of FIG. 1, with like parts having reference numerals preappended with a "1."

In the system 120, as the first flow of coolant $F_1$ enters the first heat exchanger 130 at the inlet 138, the flow of coolant $F_1$ is exposed to the first plurality of heat pipes 152A-152D. Downstream of the outlet 168, a selectively adjustable flow regulator 172 is configured to either direct the first flow of coolant $F_1$ back to the coolant loop 126 via a return line 174, or to an inlet 176 of the second heat exchanger 132, where, for purposes of this disclosure, the flow will be referred to as a "second" flow of coolant $F_2$, although though the actual fluid providing the flow of coolant is the same.

When additional cooling is required, the flow regulator 172 is adjusted by the control unit 146 to direct the first flow of coolant $F_1$ to the second heat exchanger 132. Within the second heat exchanger 132, the second flow of coolant $F_2$ is then further cooled by exposure to the second plurality of heat pipes 158A-158D before it is expelled from the outlet 178 of the second heat exchanger 132 and returned to the coolant loop 126 via a return line 180. The adjustable flow regulator 172 may be a known type of three-way valve, including an electro-mechanical three-way valve.

Figure 3:
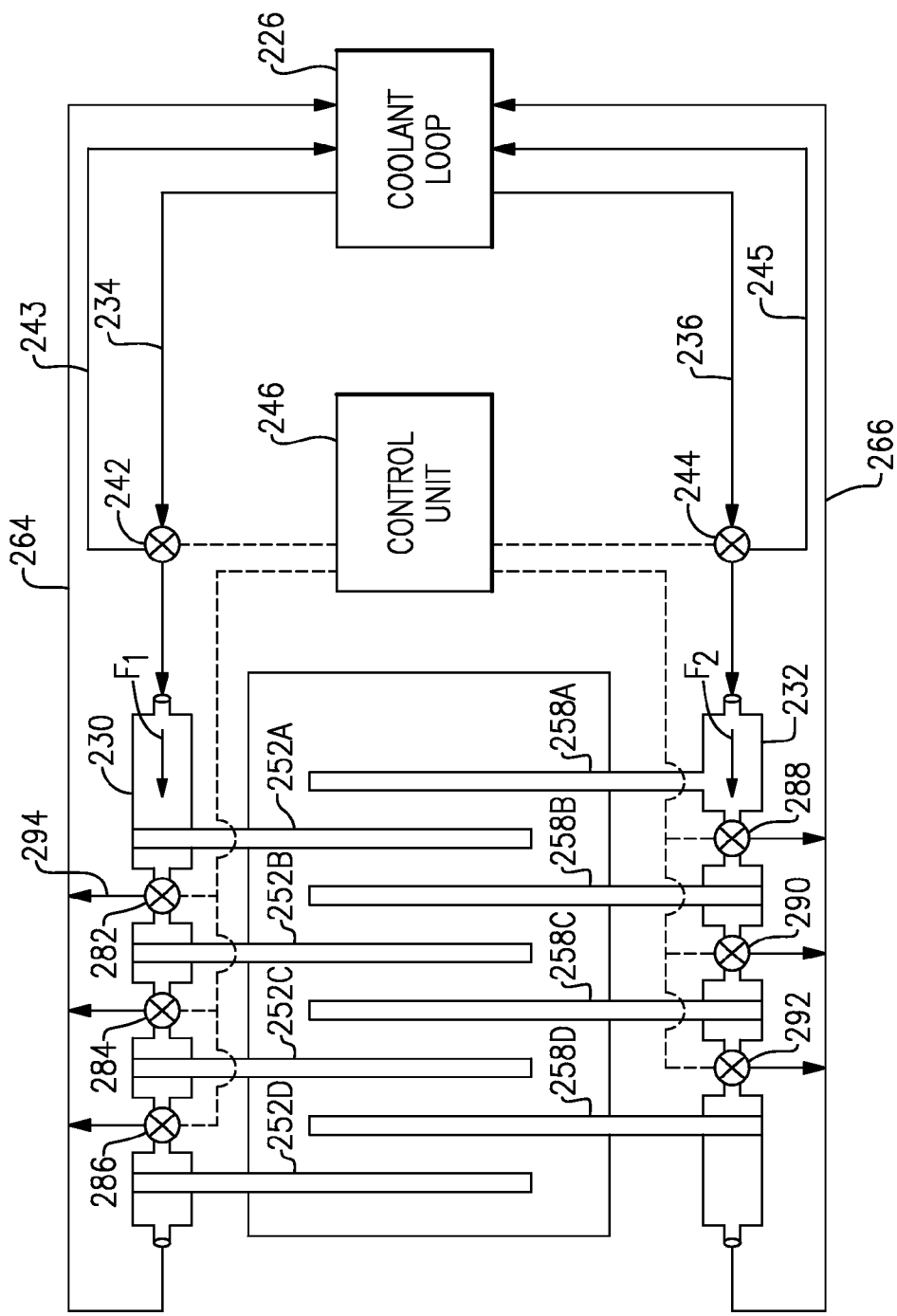
FIG. 3 schematically illustrates a third example system according to this disclosure.

While the systems 20, 120 are configured to direct flow to a select group of heat pipes to provide variable heat rejection, the system 220 illustrated in FIG. 3 is capable of further customizing the level of heat rejection. To the extent not otherwise described or shown, the system 220 corresponds to the system 20 of FIG. 1, with like parts having reference numerals preappended with a "2."

In the system 220, the first and second heat exchangers 230, 232 include flow regulators between each individual heat pipe 252A-D, 258A-D. The flow regulators in the first heat exchanger 230, are illustrated schematically at 282, 284, 286. In the second heat exchanger 232, the flow regulators are illustrated at 288, 290, 292. The control unit 246 is electrically coupled to each of the flow regulators 282, 284, 286, 288, 290, 292. Further, as in the system 20, the control unit 246 is coupled to first and second flow regulators 242, 244. While the system 220 includes the parallel inlet and return lines 234, 236, 264, 266 (like in the system 20), it should be understood that the valve arrangement within the heat exchangers 230, 232 could be incorporated into the serial arrangement of the system 120.

It should be understood that each of the flow regulators 282, 284, 286, 288, 290, 292 may be a known type of three-way valve, including electromechanical valves. Each of the flow regulators may be selectively adjustable to either route flow downstream, to the next, downstream heat pipe, or back to a return line 264, 266. For example, where a relatively low level of cooling is required, the control unit 246 is configured to open the first flow regulator 242 and adjust the position of the flow regulator 282 such that it directs coolant to the return line 264 via an outlet line 294. When more cooling is required, the control unit 246 adjusts the flow regulator 282 to direct flow downstream, to additional heat pipes, as needed, to increase heat rejection.

Figure 4:
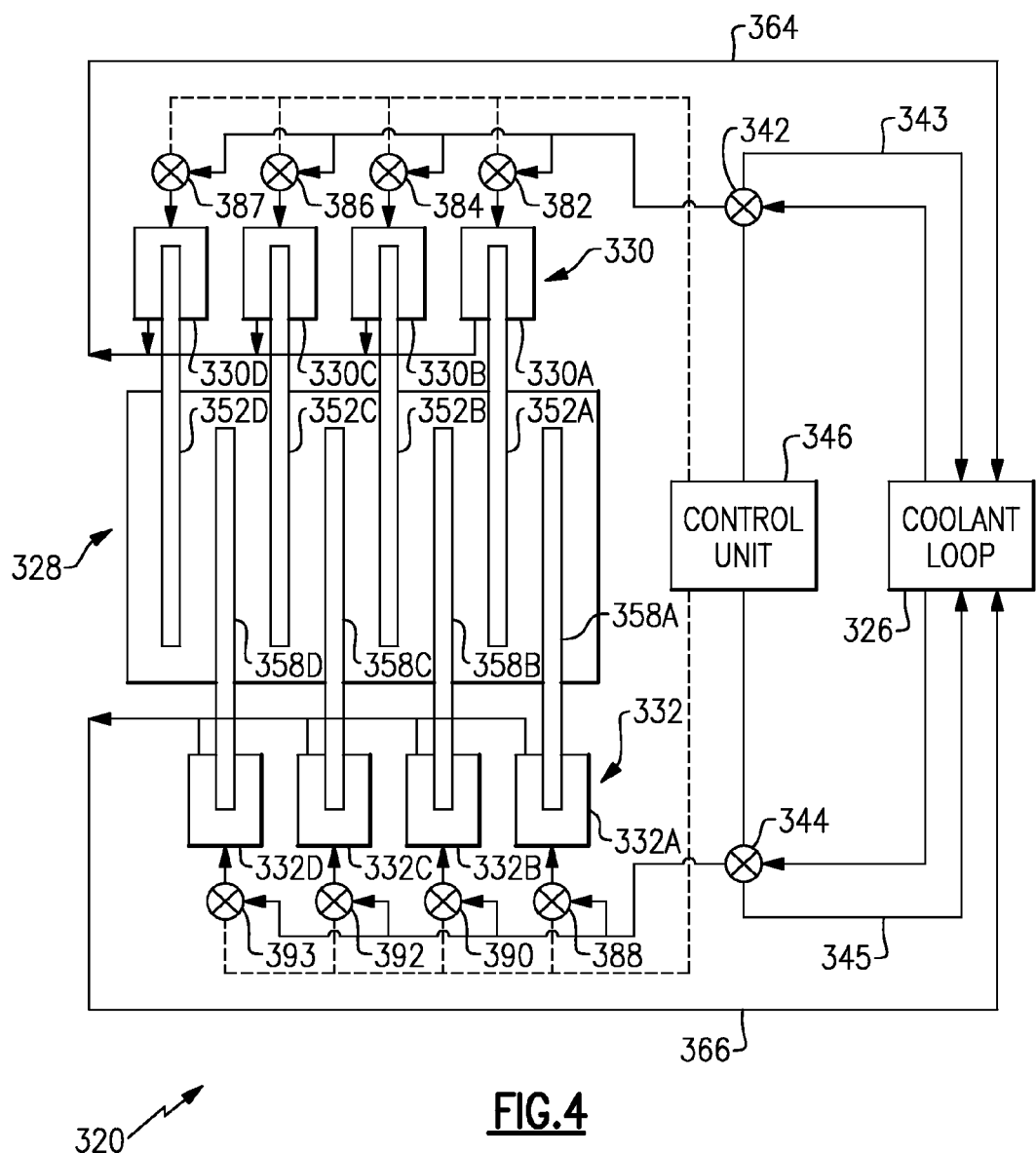
FIG. 4 schematically illustrates a fourth example system according to this disclosure.

Still another example system 320 is illustrated in FIG. 4. To the extent not otherwise described or shown, the system 320 corresponds to the systems 20, 120, 220 of FIGS. 1-3, with like parts having reference numerals preappended with a "3."

Whereas the FIG. 3 example includes flow regulators 282, 284, 286, 288, 290, 292 configured to direct fluid over adjacent heat pipes in series, the FIG. 4 example directs fluid over the heat pipes in parallel. In particular, in FIG. 4, the heat exchangers 330, 332 each include four separate heat exchanger portions 330A-330D, 332A-332D. The heat pipes 352A-352D, 358A-358D project from the heat pipe heat exchanger 328 into a respective heat exchanger portion 330A-330D, 332A-332D. Selectively adjustable flow regulators 382, 384, 386, 387, 388, 390, 392, 393 are provided in parallel with one another, and between a respective flow regulator 342, 344 and one of the heat exchanger portions 330A-330D, 332A-332D. The control unit 346 provides instructions to selectively open the various adjustable flow regulators 384, 386, 387, 388, 390, 392, 393 to provide a desired level of cooling.

This disclosure provides a selectively adjustable level of heat rejection, which is particularly useful in space applications as internal and external conditions may vary widely. This disclosure further provides a relatively constant internal temperature, which is comfortable for occupants and generally more efficient than a typical, one-size-fits-all type of radiator.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system, comprising:
   a control unit;
   a heat pipe heat exchanger, a first heat exchanger, a second heat exchanger, a plurality of first heat pipes having first and second ends, and a plurality of second heat pipes having first and second ends;
   where the first ends of the first heat pipes project into the first heat exchanger, where the first ends of the second heat pipes project into the second heat exchanger, and where the second ends of the first and second heat pipes project into the heat pipe heat exchanger;
   a first valve selectively adjustable in response to instructions from the control unit to direct a first flow of fluid to the first heat exchanger; and
   a second valve selectively adjustable in response to instructions from the control unit to direct a second flow of fluid to the second heat exchanger;
   wherein the first heat exchanger further includes a first set of valves, wherein each valve of the first set of valves is fluidly located between the first ends of two adjacent first heat pipes, wherein the valves of the first set of valves are fluidly arranged in series with respect to each other, and wherein the valves of the first set of valves are adjustable in response to instructions from the control unit to selectively direct fluid in series over the first ends of the first heat pipes, wherein the second heat exchanger further includes a second set of valves, wherein each valve of the second set of valves is fluidly located between the first ends of two adjacent second heat pipes, wherein the valves of the second set of valves are fluidly arranged in series with respect to each other, and wherein the valves of the second set of valves are adjustable in response to instructions from the control unit to selectively direct fluid in series over the first ends of the second plurality of heat pipes.

2. The system as recited in claim 1, wherein the first and second heat exchangers are arranged in parallel to one another.

3. The system as recited in claim 1, wherein the heat pipe heat exchanger is arranged to expose each of the first and second heat pipes to an external environment.

4. The system as recited in claim 3, wherein:
   the system is embodied on a spacecraft and the external environment is outer space;
   the control unit is electrically coupled to at least one sensor configured to generate a signal indicative of conditions within the spacecraft; and
   the control unit is configured to selectively adjust the first and second sets of valves based on the conditions within the spacecraft.

5. The system as recited in claim 4, wherein:
   the control unit is electrically coupled to at least one sensor configured to generate a signal indicative of the conditions external to the spacecraft; and
   the control unit is configured to selectively adjust the first and second sets of valves based on the conditions outside the spacecraft.

6. A system, comprising:
   a control unit;
   a heat pipe heat exchanger, a first heat exchanger having a plurality of first heat exchange portions, a second heat exchanger having a plurality of second heat exchange portions, a plurality of first heat pipes having first and second ends, and a plurality of second heat pipes having first and second ends;
   wherein the first ends of the first heat pipes each project into a respective first heat exchange portion of the first heat exchange portions, where the first ends of the second heat pipes each project into a respective second heat exchange portion of the second heat exchange portions, and where the second ends of the first and second heat pipes project into the heat pipe heat exchanger;
   a first valve selectively adjustable in response to instructions from the control unit to direct a first flow of fluid to the first heat exchanger; and
   a second valve selectively adjustable in response to instructions from the control unit to direct a second flow of fluid to the second heat exchanger;
   wherein the first heat exchanger further includes a first set of valves, wherein each valve of the first set of valves is fluidly connected to a respective first heat exchange portion of the plurality of first heat exchange portions, wherein the valves of the first set of valves are fluidly arranged in parallel with respect to each other, and wherein the valves of the first set of valves are adjustable in response to instructions from the control unit to selectively direct fluid in parallel over the first ends of the first heat pipes, wherein the second heat exchanger further includes a second set of valves, wherein each valve of the second set of valves is fluidly connected to a respective second heat exchange portion of the plurality of second heat exchange portions, wherein the valves of the second set of valves are fluidly arranged in parallel with respect to each other, and wherein the valves of the second set of valves are adjustable in response to instructions from the control unit to selectively direct fluid in parallel over the first ends of the second heat pipes.

* * * * *